United States Patent

Hartman et al.

[11] Patent Number: 5,098,720
[45] Date of Patent: Mar. 24, 1992

[54] LIGNIN FLAVORED GUM COMPOSITIONS

[75] Inventors: Scott E. Hartman, Roosevelt; Charles P. Orfan, Howell, both of N.J.

[73] Assignee: Wm. Wrigley Jr. Company, Chicago, Ill.

[21] Appl. No.: 705,503

[22] Filed: May 24, 1991

[51] Int. Cl.$^5$ .............................................. A23G 3/30
[52] U.S. Cl. ........................................ 426/3; 426/6; 424/48
[58] Field of Search ...................... 426/3–6, 426/533; 424/48

[56] References Cited

U.S. PATENT DOCUMENTS

| | | | |
|---|---|---|---|
| 1,040,285 | 10/1912 | Darling | 426/6 |
| 1,240,875 | 9/1917 | Pratt | 426/6 |
| 4,415,593 | 11/1983 | Glass et al. | 426/6 |
| 4,746,513 | 5/1988 | Smith | 424/408 |
| 4,808,574 | 2/1989 | Brekhman et al. | 514/23 |
| 4,906,480 | 3/1990 | Kashket | |

FOREIGN PATENT DOCUMENTS 903194 6/1972 Canada .
1-138940 5/1990 Japan .

OTHER PUBLICATIONS

Neimela, *Low-Molecular-Weight Compounds in Pine Kraft Black Liquors*, Wood and Pulping Chemistry, 1989, p. 331.
Glasser et al., Lignin.

*Primary Examiner*—Jeanette Hunter
*Attorney, Agent, or Firm*—Willian Brinks Olds Hofer Gilson & Lione

[57] ABSTRACT

A gum composition and gum base enhanced with the addition of lignin.

16 Claims, No Drawings

LIGNIN FLAVORED GUM COMPOSITIONS

BACKGROUND OF THE INVENTION

This invention relates to chewing gums and bases for use in making chewing gums.

Many individuals prefer chewing gums that have natural, earthy flavors. For example, chewing gums containing natural gums have such flavor. However synthetic elastomers—used more frequently in gum bases because they are less expensive than natural gums—do not have such flavor. Chewing gums containing synthetic elastomers also contain added flavors and colorants (e.g. flavor acids such as citric or tartaric acids used typically for fruit-flavored confections, and natural and artificial colorants), but they still do not have a taste or color similar to chewing gums containing natural gums.

A compound that would cause a chewing gum containing synthetic elastomers (such as styrene-butadiene and isoprene-isobutylene copolymers) to taste similar to chewing gums with natural elastomers would be very beneficial. This type of compound would result in greater consumer appeal by offering synthetic elastomer-containing chewing gum products that are similar to the more expensive gum products that contain natural gums.

SUMMARY OF THE INVENTION

The present invention relates to a chewing or bubble gum product having improved, natural flavor and color characteristics due to the addition of lignin. Lignin in a gum base or in a finished gum results in a product having a brown, lightly speckled color that varies depending on the amount of lignin used and that is similar to the color of these confections when natural gums such as chicle, jelutong, and massaranduba balata are used as one or more of the ingredients.

Also, gums made using lignin have an earthy, natural taste similar to products that contain natural gums.

DETAILED DESCRIPTION OF THE INVENTION

Lignin is a highly complex, non-polysaccharide, naturally occurring polymer classified as a polyphenolic ether having the chemical formula $(HOCH_{30}Ar)n$, where n is the number of repeating polymeric units, typically about 7000, and Ar is an aromatic ring. It is the second most abundant plant polymer found in nature. It is found mainly within the central lamella of plants such as the coniferous softwoods and is a source of vanillin artificial flavorant. It is insoluble in water, is not digestible by humans and is classified as a dietary fiber.

Its physical characteristics are a brown fine powder having a vanilla odor and an earthy, woodsy, natural taste. The physical forms available vary from powder to slurry type such as an emulsion.

Lignin may constitute from about 0.01 to 10 percent by weight of the gum base and preferably from about 0.09 to about 5.0 percent and more preferably from about 0.1 to about 2.0 percent. For the final gum composition, gum base containing lignin may be used from about 5 to about 95 percent by weight of the final gum composition and preferably from about 10 to about 50 percent and more preferably from about 20 to about 35 percent. The amount of lignin in the gum is from about 0.01 to about 10.0 percent and preferably from about 0.09 to about 5.0 percent and even more preferably from about 0.1 to about 3.5 percent by weight of the final gum base composition.

Lignin may also be added to both gum base and gum, in any combination, resulting in a level of lignin in the final gum as described.

Lignin may also be added to gum or gum base ingredients, resulting in an admixture of gum base ingredient or ingredients and lignin and/or an admixture of gum ingredient or ingredients and lignin. These admixtures may subsequently be added to the other gum base ingredients or to the other gum ingredients during their respective processing.

In general, a chewing gum composition typically comprises a water-soluble bulk portion and a water-insoluble chewable gum base portion and, typically water-insoluble flavoring agents. The water-soluble portion dissipates with a portion of the flavoring agent over a period of time during chewing. The gum base portion is retained in the mouth throughout the chew.

The insoluble gum base generally comprises elastomers, elastomer plasticizers, waxes, softeners/emulsifiers, fillers/texturizers and miscellaneous ingredients such as antioxidants, preservatives, colorants and whiteners. Elastomers constitute about 5 to about 95 percent by weight of the base, and may include synthetic elastomers such as polyisobutylene, isobutylene-isoprene copolymer, styrene-butadiene copolymer, polyvinylacetate, vinyl acetate-vinyl laurate copolymer or mixtures thereof. Natural elastomers may also include natural rubber such as smoked or liquid latex and guayule as well as natural gums such as jelutong, lechi caspi perillo, massaranduba balata, massaranduba chocolate, nispero, rosindinha, chicle, gutta hang kang or mixtures thereof. However, lignin has its principle advantages when used with synthetic elastomers.

Elastomer plasticizers constitute from about 0 to about 75 percent by weight of the gum base. Elastomer plasticizers include natural rosin esters such as glycerol ester of partially hydrogenated rosin, glycerol ester of polymerized rosin, glycerol ester of partially dimerized rosin, glycerol ester of rosin, pentaerythritol esters of partially hydrogenated rosin, partially hydrogenated methyl esters of rosin, pentaerythritol ester of rosin or mixtures. Elastomer plasticizers include synthetics such as terpene resins derived from alpha-pinene, beta-pinene and/or d-limonene.

Waxes include synthetic (e.g. polyethylene and Fischer-Tropsch waxes) and natural (candelilla carnauba, beeswax, rice bran or mixtures thereof) and petroleum (e.g. microcrystalline and paraffin).

Softeners/emulsifiers include tallow, hydrogenated tallow, hydrogenated and partially hydrogenated vegetable oils, cocoa butter, glycerol monostearate, glycerol triacetate, lecithin, mono-, di- and triglycerides and fatty acids (e.g. steric, palmitic, oleic, linoleic and linolenic acids) or mixtures thereof.

Fillers/texturizers includes magnesium and calcium carbonate, ground limestone and silicate types such as magnesium and aluminum silicate, clay, alumina, talc as well as titanium oxide, mono-, di- and tricalcium phosphate, cellulose polymers such as ethyl, methyl and wood or mixtures thereof. Preferably, the filler comprises about 5 to about 50 percent by weight of the gum base.

Colorants and whiteners include FD&C-type lakes, fruit and vegetable extracts, titanium dioxide or mixtures thereof.

Natural or artificial antioxidants/preservatives include BHA, BHT, beta-carotenes, acidulants (e.g. Vitamin C), propyl gallate and the like.

According to the preferred embodiment of the present invention the insoluble gum base constitutes between about 5 to about 95 percent by weight of the gum. More preferably the insoluble gum base comprises between 10 and 50 percent by weight of the gum and most preferably about 20 to about 35 percent by weight of the gum. The present invention contemplates employing any commercially acceptable gum base.

The base of the invention is typically prepared by adding an amount of the elastomer, elastomer solvent and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the balance of the elastomer solvent, filler, softeners, etc. are added in a sequential manner until a completely homogeneous molten mass is attained. This can usually be achieved in one to four hours, depending on the formulation. The final mass temperature can be between 60° C. and 150° C. and preferably between 80° C. and 120° C. The completed molten mass is emptied from the mixing kettle into coated or lined pans, extruded or cast into any desirable shape and allowed to cool and solidify.

If lignin is to be added to the gum base, it can be added at any time during the above described process, preferably just prior to the final quarter of the gum base mixing time. Also, lignin maybe blended or compounded with separate gum base ingredients, alone or in combination, and these pre-blends may be added to the base during its processing.

The water-soluble portion of the chewing gum may comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

Sweeteners can be artificial or natural. Such sweeteners include but are not limited to sorbitol, mannitol, xylitol, maltitol, thaumatin, monellin, alitame, aspartame, saccharin, acesulfamepotassium, hydrogenated starch hydrolysates, dextrose, maltose, dextrin, dried invert sugar, fructose, levulose, galactose, cornsyrup solids, and the like, alone or in combination.

A flavoring agent in addition to the lignin may be present in the chewing gum in an amount within the range of from about 0.1 to about 10.0 percent and preferably from about 0.5 to about 5.0 weight percent of the gum. The flavoring agents may comprise essential oils, synthetic flavors, or mixtures thereof including but not limited to oils derived from plants and fruits such as citrus oils, fruit essences, peppermint oil, spearmint oil, clove oil, oil of wintergreen, anise, and the like. Artificial flavoring components are also contemplated. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

Lignin has no known adverse effects on other ingredients used in typical gum bases and finished chewing gums, and is stable in the presence of other gum ingredients, e.g. medicaments, vitamins, minerals, flavor aids, added colorants, flavor oils, and the like. Thus, these optional ingredients can be formulated into a lignin-containing gum, especially when it is desired to mask the flavor of such ingredients. For example, with medicants and minerals, it is often desired to mask their flavor.

Lignin for the present invention was obtained from Westvaco Chemical Division, Charleston Heights, S.C. under the trade name Indulin AT. Lignin may be collected and purified by various processes (i.e. Canadian Patent No. 903,194 to Surianni) and may also be supplied in various physical forms such as but not limited to fine powder, emulsions or suspensions, all of which are suitable for this invention. More of the emulsion and suspension forms of lignin may need to be added to the gum base or gum than for the powdered form (by weight) to achieve the desired effect.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first softening (e.g. with heat) the gum base and adding it to a running mixer. The base may also be softened in the mixer itself. Color or emulsifiers may also be added at this time. A softener such as glycerin may also be added at this time along with syrup and a portion of bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

As mentioned earlier, the lignin may be added either directly to the gum base or to the finished gum or both during their typical processing. By typical processing it is meant that ingredients of the gum base are added in a sequential manner to typically a steam-jacketed sigma blade mixer having a typical blade speed ratio of 2:1, and these ingredients allowed to blend into a mass for one to four hours. The lignin may be added at any time during this process, but it is recommended that it be added approximately from the middle to before the final quarter of the mixing cycle.

To add lignin directly to the finished gum, the gum base is added to a typical mechanical device that either compounds the gum base with or without heat using sigma blade action typically in the ratio of 2:1, and other finished gum ingredients are subsequently added. The gum base can alternatively be placed in device that supplies heat only, to soften a gum base, and the lignin can be added and mixed by other means such but not limited to a propeller driven action or by hand.

The amount of lignin that may be directly added to the gum base or to the finished gum in either of its above-mentioned processes or to both base and finished gum concomitantly may range from about 0.01 percent by weight to about 10.0 percent by weight, preferably from about 0.09 percent by weight to about 5.0 percent by weight, and most preferably 0.1 to 2.0 percent by weight of the final gum composition.

The temperature of the blended or compounded gum base mass may range from about 60° C. to about 150° C. and preferably between about 80° C. to about 120° C. For chewing gum or bubble gum mass or blending the methods well known to those skilled in the art of gum base manufacture.

Table I below contains examples (A-D) of various gum bases within the scope of this invention where lignin is added to the base as well as examples E and F of gum bases without lignin that can be used to make a finished gum composition containing lignin as described in Table II below. These specific gum bases can be made according to the general processes described above.

TABLE I

| BASE DESIGNATION | A | B | C | D | E | F |
|---|---|---|---|---|---|---|
| NATURAL ELASTOMER | | | | | | |
| Jelutong | 1.0 | — | — | — | 1.0 | — |
| SYNTHETIC ELASTOMER | | | | | | |
| Isoprene-isobut. copol. | 9.0 | 11.0 | — | 10.0 | 9.0 | 4.0 |
| Styrene-butadiene copol. | — | — | 11.0 | — | — | 11.0 |
| Polyisobutylene | 3.0 | 12.0 | — | 22.0 | 3.0 | — |
| Polyvinyl acetate | 4.0 | 21.0 | 18.0 | 8.0 | 4.0 | 14.0 |
| ELASTOMER PLASTICIZERS | | | | | | |
| Terpene resin | 10.0 | — | — | 25.0 | — | — |
| Rosin ester | 13.0 | — | 14.0 | — | 23.0 | 23.0 |
| FILLERS | | | | | | |
| Calcium carbonate | — | 15.9 | 12.9 | 7.9 | — | 14.9 |
| Talc | 18.7 | — | 4.0 | — | 18.9 | 4.0 |
| SOFTENERS | | | | | | |
| Microcrystalline wax | 23.0 | — | 9.0 | 12.0 | 33.0 | — |
| Paraffin wax | 12.0 | — | — | — | 2.0 | 9.0 |
| Glycerol Monostearate | — | 9.0 | 9.0 | 3.0 | — | 5.0 |
| WATER INSOL. PLASTICIZERS | | | | | | |
| Hydrog. veg. oil | — | 21.0 | 16.0 | 2.0 | — | 11.0 |
| Fat | 6.0 | 12.0 | 2.0 | — | 3.0 | 4.0 |
| Unmodified oil | — | 6.0 | 2.0 | 5.0 | 3.0 | — |
| COLOR | | | | | | |
| FD&C Lakes | 0.1 | — | — | — | — | — |
| LIGNIN | | | | | | |
| Indulin AT (Westvaco) | 0.1 | 1.0 | 2.0 | 5.0 | — | — |
| ANTIOXIDANT | | | | | | |
| BHT | 0.1 | — | — | 0.1 | 0.1 | — |
| BHA | — | 0.1 | 0.1 | — | — | 0.1 |
| TOTAL | 100% | 100% | 100% | 100% | 100% | 100% | processing temperature may range from about 0° C. to about 80° C. and preferably about 30° C. to about 50° C.

If dark specks inherent with lignin is not a desired characteristic of the final gum base product, than these specks may be removed by typically centrifugation methods well known to those skilled in the art of gum base manufacture.

Table II below contains examples (G-L) of various finished gum compositions within the scope of this invention that contain lignin, employing bases set forth in Table II. These specific gum compositions can be made according to the general processes described above.

TABLE II

| GUM DESIGNATION | G | H | I | J | K | L |
|---|---|---|---|---|---|---|
| GUM BASE | 35.0 | 22.0 | 18.0 | 25.0 | 23.0 | 23.0 |
| | (Base A) | (Base B) | (Base C) | (Base D) | (Base E) | (Base F) |
| BULK SWEETENERS | | | | | | |
| Sugar | 42.0 | — | 53.2 | — | — | 49.0 |
| Sorbitol | — | 51.0 | — | 51.1 | 52.3 | — |
| WATER INSOL. PLAST. | | | | | | |
| Glycerol monostearate | — | 1.0 | — | 0.5 | 0.5 | — |
| Lecithin | 1.0 | — | 0.5 | 0.5 | 0.5 | 1.0 |
| SOFTENERS | | | | | | |
| Glycerin | 1.0 | 2.0 | 3.0 | 0.9 | 1.0 | 1.0 |
| Corn syrup | 19.0 | 22.0 | 25.0 | 21.0 | 20.0 | 23.0 |
| LIGNIN | | | | | | |
| Indulin AT (Westvaco) | — | 1.4 | — | — | 1.0 | 2.0 |
| COLORANT | | | | | | |
| FD&C Lakes | 1.0 | — | — | — | 0.5 | — |
| FLAVORANT | | | | | | |
| Spearmint oil | — | 0.5 | — | 0.9 | — | 1.0 |
| Peppermint oil (spray dried) | 1.0 | — | 0.3 | — | 1.0 | — |
| ARTIFICIAL SWEETENERS | | | | | | |
| Aspartame | — | 0.1 | — | — | — | — |
| Acesulfame-k | — | — | — | 0.1 | 0.2 | — |

TABLE II-continued

| GUM DESIGNATION | G | H | I | J | K | L |
|---|---|---|---|---|---|---|
| TOTAL | 100% | 100% | 100% | 100% | 100% | 100% |

While several embodiments have been described, other embodiments will be apparent to those of ordinary skill in the art. All such embodiments are considered to be within the scope of this invention unless the claims that follow expressly state otherwise.

What is claimed is:

1. A chewing gum base comprising:
   a) from about 5 to about 95 percent by weight of an elastomer;
   b) from about 0 to about 75 percent by weight of an elastomer plasticizer; and
   c) from about 0.01 to about 10.0 percent by weight lignin.

2. The base of claim 1 wherein the gum base is a bubble gum base.

3. The chewing gum base of claim 1 wherein lignin comprises about 0.09 to 5.0 percent by weight of the base.

4. The chewing gum base of claim 2 wherein lignin comprises 0.1 to 2.0 percent of the base.

5. The base of claim 1 wherein the lignin is added as a dry powder.

6. The base of claim 5 wherein the lignin is added as a slurry or an emulsion, or a suspension.

7. The gum base of claim 1 wherein lignin is pre-blended or pre-compounded with another gum base ingredient, and said pre-blend is added to the gum base during its processing.

8. The base of claim 1 wherein said lignin contains small dark brown particulate matter to enhance the appearance of the base.

9. A gum composition, comprising:
   (a) a water-soluble bulk portion having a sweetening agent;
   (b) 5 to 95 percent by weight of a water-insoluble base portion having an elastomer; and
   (c) from about 0.01 to about 10.0 percent by weight of lignin.

10. The gum composition of claim 8 wherein lignin comprises about 0.09 to 5.0 percent by weight of gum composition.

11. The gum composition of claim 9 wherein lignin comprises 0.1 to 3.5 percent of the gum composition.

12. The gum composition of claim 8 wherein said lignin is added as a dry powder.

13. The gum composition of claim 8 wherein said lignin is added as a slurry, an emulsion or a suspension.

14. The gum composition of claim 8 wherein said lignin contains particles sufficiently large as to be visible as speckles in said gum.

15. The gum composition of claim 8 further including a flavoring agent in addition to said lignin.

16. The gum composition of claim 8 further including a pharmaceutical agent.

* * * * *